United States Patent
Lin et al.

(10) Patent No.: US 6,420,451 B1
(45) Date of Patent: Jul. 16, 2002

(54) IMPACT RESISTANT UV CURABLE HARDCOATINGS

(75) Inventors: Shi Lin; Sunder Ram, both of Petaluma, CA (US)

(73) Assignee: Sola International, Inc., San Diego, CA (US)

( * ) Notice: Subject to any disclaimer, the term of this patent is extended or adjusted under 35 U.S.C. 154(b) by 0 days.

(21) Appl. No.: 09/735,269

(22) Filed: Dec. 11, 2000

(51) Int. Cl.$^7$ .............................. C08F 2/50; G02C 7/02; B32B 27/30

(52) U.S. Cl. .............................. 522/83; 522/96; 522/81; 522/77; 522/152; 522/109; 522/173; 522/182; 522/120; 522/121; 428/412; 428/141; 428/142; 428/143; 428/144; 428/145; 428/147; 428/149; 428/424.2; 351/166

(58) Field of Search ............................... 428/424.2, 412, 428/141, 144, 142, 145, 143, 147, 149; 522/96, 109, 110, 111, 81, 83, 77, 152, 173, 178, 182, 120, 121; 351/166

(56) References Cited

U.S. PATENT DOCUMENTS

| | | | |
|---|---|---|---|
| 4,027,073 A | | 5/1977 | Clark |
| 4,319,811 A | * | 3/1982 | Tu et al. ..................... 351/166 |
| 4,348,462 A | | 9/1982 | Chung |
| 4,378,250 A | | 3/1983 | Treadway et al. |
| 4,455,205 A | | 6/1984 | Olson et al. |
| 4,478,876 A | | 10/1984 | Chung |
| 4,486,504 A | | 12/1984 | Chung |
| 4,491,508 A | | 1/1985 | Olson et al. |
| 4,954,591 A | | 9/1990 | Belmares |
| 5,104,692 A | | 4/1992 | Belmares |
| 5,137,344 A | | 8/1992 | Kagei |
| 5,173,368 A | | 12/1992 | Belmares |
| 5,236,968 A | | 8/1993 | Hirschmann |
| 5,258,225 A | | 11/1993 | Katsamberis |
| 5,310,577 A | | 5/1994 | Mase et al. |
| 5,619,288 A | * | 4/1997 | White et al. ................ 351/159 |
| 5,712,325 A | | 1/1998 | Lewis et al. |
| 5,719,705 A | | 2/1998 | Machol |
| 5,907,000 A | * | 5/1999 | Treadway ..................... 522/182 |
| 5,916,669 A | * | 6/1999 | Parker et al. ................ 428/213 |
| 5,963,373 A | | 10/1999 | Kayanoki |
| 5,977,200 A | * | 11/1999 | Lake ........................... 359/581 |
| 5,990,188 A | | 11/1999 | Patel et al. |
| 6,087,413 A | * | 7/2000 | Lake ........................... 522/74 |
| 6,110,015 A | * | 8/2000 | Christianson et al. ......... 451/41 |
| 6,231,629 B1 | * | 5/2001 | Christianson et al. ......... 51/295 |
| 6,284,835 B1 | * | 9/2001 | Ellison ........................ 524/590 |
| 6,316,515 B1 | * | 11/2001 | Lake ........................... 522/75 |

FOREIGN PATENT DOCUMENTS

| | | |
|---|---|---|
| EP | 0505737 A1 | 9/1992 |
| EP | 0678563 B1 | 7/1997 |
| EP | 0864618 A2 | 9/1998 |
| EP | 0583355 B1 | 3/1999 |
| JP | 2586487 B2 | 6/1987 |
| WO | WO92/17536 | 10/1992 |
| WO | WO9417116 | 8/1994 |
| WO | WO97/25370 | 7/1997 |

\* cited by examiner

Primary Examiner—James J. Seidleck
Assistant Examiner—Sanza L. McClendon
(74) Attorney, Agent, or Firm—Burns Doane Swecker & Mathis, L.L.P.

(57) ABSTRACT

Curable compositions that are particularly suitable for coating plastic ophthalmic lenses includes (a) 20% to 80% of a first acrylated aliphatic urethane; (b) 5% to 50% of a monofunctional acrylate; (c) (i) 2% to 30% of a second acrylated aliphatic urethane or (ii) 2% or 25% of a multifunctional acrylate or (iii) a combination of (i) and (ii); (d) 1% to 30% of a colloidal metal oxide; (e) 1% to 20% of a photoinitiator; and (f) a solvent, with the percentages based on weight. The cured composition provides superior abrasion and impact resistance as well as protection against environmental and chemical agents. In addition, the UV curable compositions are capable of forming films on various substrates; the film has excellent compatibility and adhesion to AR coatings that are applied thereon. No primer coating is required.

14 Claims, No Drawings

IMPACT RESISTANT UV CURABLE HARDCOATINGS

FIELD OF THE INVENTION

The invention relates to radiation curable coating compositions for plastic articles and particularly to coating compositions for ophthalmic lenses that exhibit improved abrasion resistance, excellent impact resistance, excellent adhesion to various substrates and compatibility with anti-reflective coatings.

BACKGROUND OF THE INVENTION

Plastic materials have been used as substitutes for glass lenses in the ophthalmic industry because of their unique properties such as lighter weight, superior shatter resistance, and ease of fabrication. Commercially available plastic ophthalmic lenses may contain diethylene glycol bis (allylcarbonate), polycarbonate, acrylic, polyurethane and other high index materials. Since most plastic ophthalmic lenses are soft and susceptible to scratching, they are commonly coated with a thin polymeric abrasion resistance hard coating.

Anti-reflective (AR) coatings on plastic ophthalmic lenses have been employed to eliminate the light reflection that would otherwise cause images to flicker. AR coatings can be created by vacuum depositing a film of inorganic materials on the hard coating layer of a plastic ophthalmic lens, but the addition of the hard anti-reflective coatings can greatly reduce the impact resistance of plastic lenses. Moreover, the Food and Drug Administration (FDA) requires that plastic ophthalmic lenses must meet a minimum impact strength of 0.2 Joules.

In an attempt to improve the impact resistance of plastic lenses, primer coatings that are applied to the plastic lens before the hard coating layer have been used. For instance, U.S. Pat. No. 5,310,577 describes a primer coating composition composed mainly of a blocked polyisocyanate and a polyol that forms a primer layer of a thermoset polyurethane. Similarly, U.S. Pat. No. 5,619,288 describes a method for imparting impact resistance to a plastic ophthalmic lens, that consists of applying a coating of a multifunctional acrylate in a solvent mixture to the back surface of lens and curing the multifunctional acrylate to form an impact resistance primer coat. A hard coat is then applied on top of the primer coat layer to provide abrasion resistance. While the use of a primer coating may improve impact resistance, it also adds an extra step in the fabricating process of semi-finished lenses. This is not desirable, especially in an Rx laboratory.

Another concern in fabricating semi-finished lenses is that an Rx laboratory must apply different coating formulations to different substrates or use pretreatment to address the adhesion problem. It would be advantageous to have a coating which has excellent adhesion to various substrates.

Accordingly, the art is in search of hard coatings which exhibit excellent adhesion to various substrates without the need for pretreatment of the substrates or of a primer coating. The hard coatings should also exhibit excellent impact resistant and compatibility with AR coatings, also without the need for a primer coating on the AR coatings.

SUMMARY OF THE INVENTION

The present invention is based in part on the development of a novel UV curable composition that is particularly suitable for coating plastic ophthalmic lenses. The cured composition provides superior abrasion and impact resistance as well as protection against environmental and chemical agents. In addition, the UV curable compositions are capable of forming films on various substrates; the film has excellent compatibility and adhesion to AR coatings that are applied thereon. No primer coating is required.

Accordingly, in one aspect, the invention is directed to a radiation curable composition that includes:

(a) 20% to 80% of a first acrylated aliphatic urethane;
(b) 5% to 50% of a monofunctional acrylate;
(c) (i) 2% to 30% of a second acrylated aliphatic urethane or (ii) 2% to 25% of a multifunctional acrylate or a combination of (i) and (ii);
(d) 1% to 30% of a colloidal metal oxide;
(e) 1% to 20% of a photoinitiator; and
(f) a solvent, wherein the percentages are by weight.

In one embodiment, the radiation curable composition further includes at least one of (i) an effective amount of a light stabilizer, (ii) dye, or (iii) a flow additive.

In another aspect, the invention is directed to a transparent article which includes:

(a) a substrate; and
(b) an impact resistant coating on a surface of said substrate wherein the coating is formed by radiation curing the above described radiation curable composition.

In a further aspect, the invention is directed method of fabricating a semi-finished plastic ophthalmic lens which includes the steps of:

(a) providing a plastic ophthalmic lens substrate having a front surface and a back surface wherein the front surface is covered with a hard coating and an antireflection coating;
(b) grinding the back side of the substrate to produce an ophthalmic lens with a desired prescription; thereafter,
(c) forming an impact resistant coating onto the back surface of the substrate by:
  (i) applying the above described radiation curable composition onto the surface; and
  (ii) curing the composition; and
(d) forming an antireflection coating onto the impact resistant coating.

DETAILED DESCRIPTION OF THE INVENTION

This invention is directed to a UV curable composition that provides durable films with improved abrasion resistance, impact resistance, and excellent adhesion on various plastic substrates. Furthermore, the films are also compatible with anti-reflective coatings. The radiation curable composition comprises: (a) 20% to 80% of a first acrylated aliphatic urethane; (b) 5% to 50% of a monofunctional acrylate; (c) (i) 2% to 30% of a second acrylated aliphatic urethane or (ii) 2% to 25% of a multifunctional acrylate or (iii) a combination of (i) and (ii); (d) 1% to 30% of a colloidal metal oxide; (e) 1% to 20% of a photoinitiator; and (f) a solvent. The percentages are based on weight. The radiation curable composition may further include effective amounts of at least one of (i) a light stabilizer, (ii) a dye, or (iii) a flow additive.

However, prior to describing the invention is further detail, the following terms will be defined:

The term "first acrylated aliphatic urethane" refers to difunctional aliphatic urethane wherein the functional groups are either an aryloyl or a methacryloyl moiety, or combinations thereof. Typically the amount of first acrylated aliphatic urethane present in the radiation curable composition ranges from about 20% to 80% and preferably from about 40% to 70%. The average molecule weight typically ranges from about 2500 to 4500 Dalton. Preferred first acrylated aliphatic urethanes include difunctional aliphatic acrylated urethanes such as, for example, those sold under the trademarks CN 962, CN 64, CN 965 and CN 966 from Sartomer Co. and EBECRYL 230 and 270 from UCB Chemicals.

The term "second acrylated aliphatic urethane" refers to trifunctional or higher functional aliphatic urethane wherein the functional groups are either acryloyl or methacryloyl moieties or combinations thereof. Typically when employed the amount of second acrylated aliphatic urethane present in the radiation curable composition ranges from about 2% to 30% and preferably from about 5% to 20%. The average molecule weight typically ranges from about 500 to 1600 Dalton. Preferred second acrylated aliphatic urethanes include highly functional acrylated urethanes such as, for example, CN 968 from Sartomer Company and EBECRYL 8301 and 1290 from UCB Chemicals.

The term "monofunctional acrylate" refers to an acrylate monomer that contains only one acryloyl or methacryloyl moiety. Typically the amount of monofunctional acarylate present in the radiation curable composition ranges from about 5% to 50% and preferably from about 15% to 40%.

The term "multifunctional acrylate" refers to an acrylate monomer or oligomer that contains at least three or more acryloyl or methacryloyl moieties or combinations thereof. Typically, when employed, the amount of multifunctional acrylate present in the radiation curable composition ranges from about 2% to 25% and preferably from about 5% to 15%. Preferred multifunctional (meth)acrylate monomers or oligomers which may be used to provide film hardness include pentaerythritol tetraacrylate, dipentaerythritol pentaacrylate, di-trimethylolpropane tetraacrylate, pentaerythritol triacrylate, tris(2-hydroxy ethyl) isocyanurate triacrylate. All of these work to improve cross-linking stability, with concomitant improvements in impact and abrasion resistance.

The term "colloidal metal oxide" refers to metal oxide particles in acrylates or organic solvents. Suitable metal oxides include, for example, silicon oxide. Typically the metal oxide particles have diameters that range from 2 nm to 60 nm and preferably from 5 nm to 50 nm. Suitable colloidal silica include acrylic and methacrylic based silica organols that are commercially available, for example, as HIGHLINK OG108-32 and OG100-31 from Clariant Corporation, MEK-ST and IPA-ST from Nissan Chemical, and FCS 100 from General Electric Company. The HIGHLINK OG108-32 is a liquid suspension of colloidal silica in tripropylene glycol diacrylate. Partially hydrolyzed alkoxysilylacrylates such as acryloxypropyltrimethoxysilane may also be used. Typically, the amount of functionalized colloidal metal oxide present in the radiation curable composition ranges from about 1% to 30% and preferably from about 3% to 20%

The term "photoinitiator" refers to agents that catalyze the polymerization of monomer systems. Suitable photoinitiators include, for example, benzophenone, 1-hydroxycyclohexyl phenyl ketone (methanone), acetophenone, and the like, and mixtures thereof. A mixture of 1-hydroxycyclohexyl phenyl ketone and benzophenone (available under the tradename IRGACURE 500 from Ciba Giegy) is particularly preferred. Typically, the amount of photoinitiator present in the radiation curable composition ranges from about 1% to 20% and preferably from about 5% to 15%.

The term "light stabilizer" refers to compounds that enhance the color of the coating by selecting absorbing radiation. Preferred light stabilizers include, for example, substituted benzophenones, benzotriazoles, hindered amines and diphenyl acrylates. A particularly preferred light stabilizer is 2,2',4,4'-tetrahydroxy benzophenone, available as UVINUL 3050 from BASF Corporation which exhibited excellent compatibility with the acrylated aliphatic urethanes. Typically, when employed, the amount of light stabilizer present in the radiation curable composition ranges from about 1% to 20% and preferably from about 2% to 10%.

The term "dye" refers to any suitable substance that neutralizes the yellow color caused by some UV absorbing materials. Preferred dyes include, for example, blue dyes or a mixture of solvent soluble dyes imparting a blue hue. The blue dye is used in combination with the dihydroxy benzophenones to obtain a neutral color. UV absorbers and dyes are described, for example, in U.S. Pat. No. 5,949,518 which is incorporated herein by reference. Typically, when employed, the amount of dye present in the radiation curable composition ranges from about 0.01% to 5% and preferably from about 0.05% to 1%.

The term "flow additive" refers to materials that enhance the rheology of the radiation curable composition. Acrylic or silicone containing surface additives are the preferred flow additives, e.g., BYK 371, BYK 358, both from BYK-Chemie USA, and FC430 from 3M Company. Typically, when employed, the amount of flow additive present in the radiation curable composition ranges from about 0.01% to 3% and preferably from about 0.05% to 0.5%.

The term "substrate" refers to a material which preferably has superior structural and optical properties. Plastics, including high index materials available under the tradename FINALITE, from Sola International, are preferred substrate materials. Preferably, the index of refraction of the substrate is at least 1.59. Substrates include ophthalmic lenses (including sunglasses). Preferred ophthalmic lenses also include laminated lenses that are fabricated by bonding two lens wafers (i.e., a front wafer and a back wafer) together with a transparent adhesive. As used herein the term "lens" refers to both single integral body and laminated types. Laminated lens wafers are described, for example, in U.S. Pat. Nos. 5,149,181 and 4,645,317 and U.K. Patent Application, GB 2,260,937A, all of which are incorporated herein.

The term "anti-reflection coating" or "AR coating" refers to a substantially transparent multilayer film that is applied to optical systems (e.g., surfaces thereof) to substantially eliminate reflection over a relatively wide portion of the visible spectrum, and thereby increase the transmission of light and reduce surface reflectance. Known anti-reflection coatings include multilayer films comprising alternating high and low refractive index materials (e.g., metal oxides) as described, for instance, in U.S. Pat. Nos. 3,432,225, 3,565,509, 4,022,947, and 5,332,618, all of which are incorporated herein. AR coatings can also employ one or more electrically conductive high and/or electrically conductive low refractive index layers which are further described in U.S. Pat. No. 5,719,705 which is incorporated herein by reference. The thickness of the AR coating will depend on the thickness of each individual layer in the multilayer film and the total number of layers in the multilayer film.

Preferably, the AR coating for the ophthalmic lens that is formed on the impact resistance UV cured hard coating has about 3 to about 12 layers. Preferably, the AR coating is about 100 to about 750 nm thick. For use with ophthalmic lenses, the AR coating is preferably about 220 to about 500 nm thick. Inorganic anti-reflective coatings can be single-layer systems, but more generally are multi-layer anti-reflective stacks deposited by vacuum evaporation, deposition, sputtering, ion plating, and/or ion bean assisted methods.

The term "solvent" is meant to include a single solvent or a mixture of solvents that dissolves the first acrylated aliphatic urethane, monofunctional acrylate, the second acrylated urethane and/or multifunctional acrylated so that the coating composition can be readily applied. Particularly preferred solvents include, for example, methyl ethyl ketone, acetone, methyl isobutyl ketone, methyl propyl ketone, cyclohexanone, cyclopentanone, butyrolactone, methanol, ethanol, isopropanol, butanol, tetrahydrofuran, N-methyl pyrrolidone, tetrahydrofurfural alcohol, and mixtures thereof. Ketones are particularly preferred because they exhibit excellent solubility of the first and second acrylated aliphatic urethanes and photoinitiator as well.

The amount of solvent used will depend on, among other things, the particularly components employed to formulate the coating composition, the temperature of the coating lenses the thickness of the film should be sufficient so that when the composition is cured, the impact resistant layer will have a final thickness that ranges from about 1 to about 12 $\mu$m and preferably from about 1.5 to about 8 $\mu$m. Thicker protective layers can lead to crazing and other defects over time, however, thinner layers often do not provide enough surface material to be resistant. Additionally, it is often advantageous to have a coating that is thick enough to cover minor blemishes on the surface of the lens.

The curable coating compositions can be cured by radiation, e.g., UV radiation. Sources of UV radiation include, for example, plasma arc discharges, mercury vapor lamps, etc. A preferred source of UV irradiation is a Fusion 300 watt/in H lamp.

Finally, an anti-reflective coating can be formed on the impact resistant layer, if desired. No surface pretreatment or formation of an adhesive or primer layer on the protective layer is required.

Experimental

Table 1 sets forth the amount (i.e., parts) of various components of coating compositions that were tested on acrylic lenses that were commercially available under the tradename SPECTRALITE from SOLA Optical USA, Petaluma Calif., and which have a hard coating PGII coated on the front (or convex) side.

TABLE 1

| Sample No. | CN 962 | CN 964 H60 | CN 968 | HEMA | MIBK | Methanone | DPHPA | IRGUCURE 500 | HIGHLINK OG 100-31 | HIGHLINK OG 108-32 | BYK 371 | Blue Dye | UNINUL 3050 |
|---|---|---|---|---|---|---|---|---|---|---|---|---|---|
| 1 |  | 50 | 20 | 30 | 233 | 5 |  |  |  |  |  |  |  |
| 2 |  | 60 | 10 | 30 | 233 | 5 |  |  |  |  |  |  |  |
| 3 | 60 |  | 10 | 30 | 223 |  |  | 10 |  |  |  |  |  |
| 4 | 50 |  | 20 | 30 | 223 |  |  | 10 |  |  |  |  |  |
| 5 | 50 |  | 20 | 30 | 233 |  |  | 10 |  | 10 |  |  |  |
| 6 | 50 |  |  | 30 | 233 |  | 20 | 10 |  | 5 |  |  |  |
| 7 | 45 |  |  | 18 | 121 |  | 30 | 10 | 10 |  | 0.242 | 0.036 | 8 |
| 8 | 45 |  |  | 18 | 121 |  | 30 | 10 | 10 |  | 0.242 | 0.036 | 8 |
| 9 | 50 |  |  | 30 | 233 |  | 20 | 10 |  | 5 |  |  |  | composition, the coating thickness, and the coating technique to be used. Typically, the solvent will comprise from about 30% to 85% of the radiation curable coating composition. For spin coating application, the solvent will preferably range from about 40% to 75% of the radiation curable coating composition.

Formulation of Coating Composition

The radiation curable coating composition is preferably formulated by blending together the first acrylated aliphatic urethane, monofunctional acrylate, the second acrylated urethane and/or multifunctional acrylated, colloidal metal oxide, and photoinitiator in a suitable organic solvent. Optional components such as the light stabilizer, dye, and/or flow additive, can also be added at this stage.

The curable coating compositions can be applied to various substrates by conventional coating methods such as, for example, spinning, dipping, spraying and the like. No surface pretreatment of the substrate or formation of an adhesive or primer layer on the substrate prior to coating is required. Spin coating is particularly preferred because it readily creates a uniform film which when cured is relatively defect free. The thickness of the coating of curable coating composition that is applied will depend on the particular substrate and application. In the case of ophthalmic plastic For Examples 1 and 2, the coating compositions were prepared by initially dissolving the CN 964 H60, CN 968, and hydroxyethyl methacrylate (HEMA) in methyl isobutyl ketone (MIBK) and mixing for 2 hours. Thereafter, 1-hydroxycyclohexyl phenyl ketone (methanone) was added and the mixture was mixed for another 15 minutes.

For Examples 3 and 4, the coating compositions were prepared by initially dissolving the CN 962, CN 968, and HEMA in MIBK and mixing for 2 hours. Thereafter, the IRGACURE 500 was added and the mixture was mixed for another 15 minutes.

For Example 5, the coating composition was prepared by initially dissolving the CN 962, CN 968, HEMA, and HIGHLIK OG108-32 in MIBK and mixing for 2 hours. Thereafter, the IRGACURE 500 was added and the mixture was mixed for another 15 minutes.

For Example 6, the coating composition was prepared by the same procedure for Example 5 except that the formulation contained dipentaerythritol pentaacrylate (DPHPA) instead of CN 968.

For Examples 7 and 8, the coating compositions were prepared by initially dissolving the CN 962, CN 968, DPHPA, HEMA, HIGHLIK OG108-31 in MIBK and mixing for 2 hours. Thereafter, IRGACURE 500 and UNINUL 3050 were added and the mixture was mixed for another 30 minutes. Finally, the BYK 371 and blue dye were added to the resin solution and stirred for 30 minutes.

For Example 9, the curable composition used was identical to that of Example 6.

Coating of Lenses with Curable Compositions

The back (or concave) side of the semi-finished lenses (from SPECTRALITE) were initially surfaced and polished to 1.5 mm nominal center thickness. After being wiped clean with isopropanol, each lens back surface was then coated with one of the radiation curable compositions of Examples 1–6. Specifically, two micron thick coatings were applied on the back side by spinning coating before being cured. In some cases, antireflection (AR) coatings were also applied to both the front and back surfaces of the lenses using a vacuum deposition process to deposit a multi-layer antireflective film. Each AR coating comprised a film having 5 layers comprising alternating layers of titanium oxide and silicon oxide, with silicon oxide being the first, third, and fifth layers. Thereafter, the lenses were subjected to adhesion and impact tests. (The conditions of these test are described herein.) Table 2 sets forth the results of the tests. As is apparent, all of the lenses with the impact resistant coatings demonstrated good adhesion and impact strength.

TABLE 2

| Coating Comp. | Adhesiveness | AR coat | Impact Resistance (Joules) |
|---|---|---|---|
| 1 | 100/100 | No | 1.6 |
| 1 | 100/100 | Yes | 0.5 |
| 2 | 100/100 | No | 1.2 |
| 2 | 100/100 | Yes | 0.7 |
| 3 | 100/100 | No | 2.0 |
| 3 | 100/100 | Yes | 0.8 |
| 4 | 100/100 | No | 1.2 |
| 5 | 100/100 | No | 1.8 |
| 6 | 100/100 | No | 1.4 |
| 6 | 100/100 | Yes | 1.0 |

Adhesion Test

The cross-cut tape test, where 6 parallel lines each in two perpendicularly crossing directions are cut with a six blade cutter was employed. The lines are cut at fixed intervals of approximately 1 mm, on the surface of the coating of a given sample to produce a total of 49 squares. Thereafter, adhesive cellophane tape is applied to the cut squares, the tape is peeled, and the squares on which the coat film are counted. The adhesion is measured by the number of squares remaining.

Impact Test

The impact resistance of the coated lenses were measured using an impact tester from American Optical Corporation based on U.S. Pat. No. 3,896,657. The tester utilizes a ⅝" diameter stainless steel ball supported by a magnet vertically above the anvil on which a lens is mounted at a fixed distance from the ball. The ball can be accelerated by different velocities using compressed air to allow for variable impact energy of the ball against the lens being tested when the ball is aimed to strike at the center of the lens. The results of this test are measured in Joules.

The curable compositions of Examples 7–9 were tested with various substrates including: (1) CR-39 lenses which are fabricated from polymerized diethylene glycol bis(ally carbonate) having a silicone hard coating on front surface, (2) polycarbonate (POLY), (3) three lenses made by Sola Optical USA, under the trademarks (i) CR Transitions (CRT), (ii) Spectralite Transitions (SPT), and (iii) High Index Finalite (Finalite). 1.5 or 2 micron thick curable compositions were coated onto the back surface of each lens which were then cured. Lenses were tested with and without antireflective coatings on both the front and back of the lens. The impact resistances of the coated lenses are set forth in Table 3. As is apparent, the lenses exhibited good impact strength.

TABLE 3

| Coating Comp | Substrate | Coating thickness ($\mu$m) | AR Coat | Impact Resistance (Joules) |
|---|---|---|---|---|
| 7 | CR39 | 2.0 | No | 1.0 |
| 7 | CR39 | 2.0 | Yes | 1.0 |
| 8 | POLY | 2.0 | No | >2.0 |
| 8 | POLY | 2.0 | Yes | >2.0 |
| 9 | SPT | 1.5 | No | 0.7 |
| 9 | SPT | 1.5 | Yes | 0.8 |
| 9 | CRT | 2.0 | No | 0.7 |
| 9 | CRT | 2.0 | Yes | 1.2 |
| 9 | FINALITE | 1.5 | No | 0.8 |
| 9 | FINALITE | 1.5 | Yes | 0.9 |

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A transparent article which comprises:
   (a) a substrate; and
   (b) an impact resistant coating on a surface of said substrate wherein the coating is formed by radiation curing a composition that comprises:
      (i) 20% to 80% of a first acrylated aliphatic urethane;
      (ii) 5% to 50% of a monofunctional acrylate;
      (iii) (1) 2% to 30% of a second acrylated aliphatic urethane or (2) 2% to 25% of a multifunctional acrylate or (3) a combination of (1) and (2);
      (iv) 1% to 30% of a colloidal metal oxide;
      (v) 1% to 20% of a photoinitiator; and
      (vi) a solvent, wherein the percentages are by weight.

2. The transparent article of claim 1 wherein the first acrylated aliphatic urethane is a difunctional acrylated aliphatic urethane.

3. The transparent article of claim 1 wherein the first acrylated aliphatic urethane has a molecular weight of between 2500 to 4500 Dalton.

4. The transparent article of claim 1 wherein the monofunctional acrylate comprises an acryloyl or a methacryloyl moiety.

5. The transparent article of claim 1 wherein the second acrylated aliphatic urethane contains 3 or more polymerizable unsaturated moieties per molecule.

6. The transparent article of claim 1 wherein the second acrylated aliphatic urethane has a molecular weight of between 500 to 1600 Dalton.

7. The transparent article of claim 1 wherein the multifunctional acrylate comprises a moiety having a hydroxyl group and three or more acryloyl groups.

8. The transparent article of claim 1 wherein the composition further comprises at least one of (i) an effective amount of a light stabilizer, (ii) dye, or (iii) a flow additive.

9. The transparent article of claim 1 wherein the substrate is an ophthalmic lens.

10. The transparent article of claim 1 wherein the impact resistant coating has a thickness of about 1 μm to 6 μm.

11. The transparent article of claim 1 wherein the ophthalmic lens is made of polycarbonates, diethylene glycol bis(allyl carbonate), or acrylic.

12. The transparent article of claim 1 wherein the ophthalmic lens is made of a plastic material having an index of refraction of at least 1.59.

13. The transparent article of claim 1 further comprising a hard coating that is formed on the impact resistant coating.

14. The transparent article of claim 1 wherein there is no adhesion layer between the coating and the substrate.

* * * * *